United States Patent
Van Houten et al.

(10) Patent No.: US 10,905,099 B2
(45) Date of Patent: Feb. 2, 2021

(54) AUTOMATIC FEEDING SYSTEM FOR PREPARING AT LEAST ONE FEED RATION FOR RUMINANT ANIMALS FROM A PLURALITY OF FEED TYPES

(71) Applicant: LELY PATENT N.V., Maassluis (NL)

(72) Inventors: Maria Johanna Aleida Van Houten, Maassluis (NL); Sjors Meijers, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 326 days.

(21) Appl. No.: 15/738,384

(22) PCT Filed: May 31, 2016

(86) PCT No.: PCT/NL2016/050389
§ 371 (c)(1),
(2) Date: Dec. 20, 2017

(87) PCT Pub. No.: WO2017/018874
PCT Pub. Date: Feb. 2, 2017

(65) Prior Publication Data
US 2018/0177151 A1   Jun. 28, 2018

(30) Foreign Application Priority Data

Jul. 10, 2015 (NL) .................................... 2015143

(51) Int. Cl.
*A01K 5/02* (2006.01)
*A01K 5/00* (2006.01)
(Continued)

(52) U.S. Cl.
CPC .............. *A01K 5/0275* (2013.01); *A01K 5/00* (2013.01); *A01K 5/02* (2013.01); *A01K 5/0266* (2013.01);
(Continued)

(58) Field of Classification Search
CPC ........... A01K 5/00; A01K 5/02; A01K 5/0275
(Continued)

(56) References Cited

U.S. PATENT DOCUMENTS 5,008,821 A * 4/1991 Pratt ........................ A01K 5/02
119/51.01
5,355,833 A * 10/1994 Legrain ................ A01K 5/0275
119/51.02
(Continued)

FOREIGN PATENT DOCUMENTS

EP 2 204 088 A1 7/2010
NL 1040480 C 5/2015

OTHER PUBLICATIONS

International Search Report, issued in PCT/NL2016/050389, dated Sep. 19, 2016.
(Continued)

*Primary Examiner* — David J Parsley
(74) *Attorney, Agent, or Firm* — Birch, Stewart, Kolasch & Birch, LLP

(57) ABSTRACT

An automatic feeding system for preparing at least one feed ration from a plurality of feed types includes a feed kitchen with multiple feed storage places for storing a plurality of feed types, a feed distributing device for receiving feed from the feed kitchen, a feed loading device to load feed from each of the feed storage places into the feed distributing device, and a control system to control the automatic feeding system. The control system includes a graphical user interface with a display screen, including a floor plan with first representations of each of the feed storage places, which representations are formed based on at least the feed storage location data, and second representations of the feed types.

20 Claims, 4 Drawing Sheets

(51) Int. Cl.
*G06F 3/0482* (2013.01)
*G06F 3/0486* (2013.01)
*G06F 3/0488* (2013.01)
*B65G 1/137* (2006.01)

(52) U.S. Cl.
CPC .......... *G06F 3/0482* (2013.01); *G06F 3/0486* (2013.01); *G06F 3/04883* (2013.01); *A01K 2227/10* (2013.01); *B65G 1/1371* (2013.01); *B65G 2203/041* (2013.01)

(58) Field of Classification Search
USPC ............... 119/51.02, 51.11, 51.13, 57.92
See application file for complete search history.

(56) References Cited

U.S. PATENT DOCUMENTS

| | | | | |
|---|---|---|---|---|
| 5,424,957 | A | * | 6/1995 | Kerkhoff ................. A01K 5/02 700/240 |
| 5,598,770 | A | * | 2/1997 | Campbell ............. A23N 17/00 99/487 |
| 6,745,126 | B1 | * | 6/2004 | Pavlak ..................... A01K 5/02 701/50 |
| 7,681,527 | B2 | * | 3/2010 | Pratt ...................... A01K 29/00 119/174 |
| 8,655,751 | B2 | * | 2/2014 | Renz .................. G06Q 10/0875 119/51.01 |
| 9,622,455 | B2 | * | 4/2017 | Wisse ..................... A01K 5/02 |

OTHER PUBLICATIONS

Written Opinion of the International Searching Authority, issued in PCT/NL2016/050389, dated Sep. 9, 2016.

* cited by examiner

AUTOMATIC FEEDING SYSTEM FOR PREPARING AT LEAST ONE FEED RATION FOR RUMINANT ANIMALS FROM A PLURALITY OF FEED TYPES

The invention relates to an automatic feeding system for preparing at least one feed ration for ruminant animals from a plurality of feed types.

Automatic feed systems known in the art generally are computer controlled systems which comprise a feed kitchen with multiple feed storage places for storing a plurality of feed types, a feed distributing device for receiving feed from the feed kitchen and a feed loading device to load feed according to a predefined ration from each of the feed storage places into the feed distributing device according to a predefined ration and a control system to control the automatic feeding system. The control system of such a feeding system generally is programmed to determine per ration which feed types and how much of the feed types are to be loaded into the feed distributing system and to control the system to prepare the ration accordingly. The feed kitchen of such prior art feeding systems generally have multiple feed storage places in order to store different types of feeds and other ingredients which are used to make the rations. The feed storage places may be bunkers, containers or places where bales can be stored or the like. The feed distributing device typically is a feed wagon which will transport feed and unload it at locations where the animals can eat from it. The feed wagons generally are either wagons suspended from and drivable along a rail or are provided with wheels to drive on the ground.

A problem with such known automatic feeding systems is the amount of data that the user must manage and recognize in order to control and monitor the automatic feed system. In known systems linking a feed type to a the feed storage place, is done by a user who inputs data in the computer in tables by typing in the indications of the feed storage place and the feed type present at that place. This must be done when setting up the system, but also upon re-stocking the kitchen. The data is inputted either traditionally by keyboard and/or using pull down menus which provide pre-defined items to select. Such a method is prone to mistakes and the user will need to know the system very well in order to spot mistakes he himself may have made when inputting the data.

When by mistake a feed type is linked to the wrong feed storage place, this will cause the system to prepare wrong rations. Such wrong prepared rations may be more expensive or when containing wrong ingredients or lacking other ingredients may even have detrimental effects on the health of the animals.

The object of the invention is to provide an automatic feeding system which will convey the operational state of the feed kitchen unambiguously to the user. Alternatively the object of the invention is to provide an improved automatic feeding system which is easier to use.

This object is obtained by the system of claim 1 in which there is provided an automatic feeding system for preparing at least one feed ration from a plurality of feed types for ruminant animals, the system comprising
 a feed kitchen with multiple feed storage places for storing a plurality of feed types,
 a feed distributing device for receiving feed from the feed kitchen,
 a feed loading device to load feed from the feed storage places into the feed distributing device and
 a control system to control the automatic feeding system, and the control system being programmed to determine per ration which feed types and how much of the feed types are to be loaded into the feed distributing device and to control the loading device and feed distributing device to prepare the ration accordingly, wherein the control system comprises
  a memory with location data of the feed storage places stored in the memory, and
  wherein the control system is programmed to link a feed type to each of the feed storage places represented by the location data,
 the control system further comprises
  a graphical user interface with a display screen, a floor plan comprising first representations of each of the feed storage places and second representations of the feed types which first representations are formed based on at least the feed storage location data
and
wherein the control system is programmed to link a feed type to a storage place when a respective first and second representation fulfill a link criterion after an action by the user.

By linking the feed type to a feed storage place representation in a graphical user interface, mistakes are less likely to be made because no storage place indication or feed type names need to be typed.

In embodiments the action is one of a select action or a drag and drop action.

By linking the feed type to a feed storage place by selecting a feed type representation or by dragging and dropping a feed type representation to a storage place representation, mistakes are less likely to be made because no storage place indication or feed type names need to be typed.

Also the result of the selection or drag and drop action is visible for direct feed back to the user. Each time the user has filled the feed kitchen he can update the system and link combinations of place and feed type in the same manner. Once the feed type is linked to the storage place the control system can instruct the loading device and feed distributing device about the correct locations of the feed types that are to be loaded in order to prepare a ration.

According to aspects of the invention the link criterion is fulfilled when, as a result of the drag and drop action, a predetermined distance between the respective representations remains or when, as a result of the drag and drop action, the respective representations at least partially overlap.

By determining the fulfillment of the link criterion based on basis of the degree that the representations end up near each other or overlapping each other, a choice can be made per representation whether the degree of adjacency or overlap is the better link criterion. For example in a feed kitchen representation with relatively big squares representing storage bunkers and smaller feed type representations, the feed type representation can easily be made to fall completely within the representation of the bunker, thus the link criterion could be set to be fulfilled only at full overlap. This is also intuitive for the user who can drag and drop the representation of e.g. maize into the bunker and upon a full overlap the link is made. Please note that overlap here means that the feed storage place representation can encompass the feed type representation. Likewise in a feed kitchen representation with feed storage representation which are positioned closely to each other, the link criterion could be set to be fulfilled only at partial overlap. In case that the feed type representation is not smaller or encompassable within the feed storage representation, and the feed storage representations are positioned closely to each other, the overlap criterion could be marked to be fulfilled when a certain predetermined actual or relative overlap has occurred. The degree of adjacency as link criterion could be advantageously chosen when there is a lot of space between the feed storage and feed type representations.

Advantageously, the screen is a touch screen. Using a touch screen on e.g. a tablet or a mobile phone as opposed to a desktop gives the user the freedom to be in or near the feed kitchen where he can see the actual situation and to immediately after stocking the feed kitchen link the feed types to the storage places. When a computer screen with a mouse is to be used those are generally located in the users office which may be remote from the kitchen, and the user lacks a view on the actual situation.

According to an aspect of the invention the graphical user interface further comprises third representations based on status data acquired by the control system, the third representations being representations of status data such as the quantity of feed at a feed place, the temperature of the feed at a feed place, the results of measurements of feed components of feed at a feed place, the feed place from which feed currently is to be loaded into the feed distributing device, a priority indication for the system to first load feed from a particular feed place, or of the actual location of the feed distributing device, or the like.

With such a status data the situation in the feed kitchen for example with respect to the quantity of feed remaining at a feed place can be conveyed to the user by the third representations. Other status data can be e.g. temperature of the feed at a feed place, which can be an indication of heating of the feed which will cause deterioration of the feed quality. Or with suitable sensors certain components of the feed at the feed places can be measured, such as water content, starch, proteins and the like. Such information about components of the feed are valuable input for the feed system and/or the user.

Advantageously the control system is programmed to display the third representations either when the user requests display or when the status data fulfills a predefined criterion.

Displaying the third representations in the graphical user interface provides the user valuable information about the working parameters of the system in a comprehensive way which is easier to process by the user then similar information presented in for example a report. The user can efficiently evaluate the information and take appropriate action if necessary. This leads to feeding system that can be efficiently managed.

However displaying all status information all the time will lead to the user paying less attention to the displayed information, and thus increases the risk that the user will not notice the information and will not take appropriate action when necessary.

Thus instead of always displaying all the third representations the system is programmed to selectively display these representations either on request or when the status data represents a situation which requires attention. For example a display of the third representation with respect to the quantity is required when the quantity at a feed place has fallen below the amount needed to prepare a ration, restocking is required and the user must be informed. In this respect it is noted that quantity of feed at a feed place typically is tracked by the system which knows how much is loaded, so this parameter can be linked by the control system to the feed type and storage place. Another example is that display of the third representation providing an indication of the temperature may be required when the temperature of a feed type at a storage place exceeds a threshold temperature and thus an undesired heat generation in the feed is noticed, which may cause deterioration of the feed quality. An action is then required by the user, such as having the system use feed from that location with priority.

A display of the priority indication linked to a feed storage place may be made dependent on whether or not the user has linked the priority indication himself or if the priority is caused by a setting in the system.

A user may link a priority indication to a feed type at a feed place for whatever reason he wants a certain feed type at a storage place to be used with priority. For example when there are multiple storage places with the same feed type, the user can restock a certain place and mark the storage place where earlier stocked feed is still present with priority. In this manner the user can re-stock certain feed storage places and in an easy way maintain a "first in first out" feed storage management by using the priority indication.

According to a further aspect of the invention the system comprises
    a location data acquisition system which is programmed
        to acquire the location data of the feed storage places
        and to store them in the memory of the control system.

Typically, when setting up a feeding system and its feed kitchen the locations of the feed storage places are measured by the technician and the data are inputted in the system. By providing a location data acquisition system such as e.g. a using a laser measuring system, 3d camera, GPS detection on a mobile measuring system, a higher level of certainty that the correct location data of the feed places are determined and stored is ensured.

Advantageously, the location data acquisition system comprises a camera positioned in the feed kitchen and comprising an image acquisition device and an image processing device being programmed to acquire and process an image of the feed kitchen and to determine the location data of the feed storage places and to store the location data in the memory of the control device.

When using a camera in the feed kitchen the system becomes easier to set up, because the feed kitchen image can be processed to recognize the feed places. For example a feed storage bunker can be recognized and its location can be determined by triangulation from a known camera position. Alternatively, the storage places could be marked out on the floor e.g. by painting outlines where the bunkers or blocks of feed should be positioned. These markings will appear in the image and can be identified by the image processing means and its the locations can be determined by triangulation from the camera position. This will provide for an efficient feed kitchen set up in the system.

Advantageously, the control system is programmed to display the feed kitchen image acquired by the camera on the screen together with the graphical user interface.

By displaying or overlaying the feed kitchen image acquired by the camera, with the graphical user interface the interface is enhanced in that the, user can see in the image a real life representation of the feed kitchen and will instantly recognize the situation. Since the location data are used to form the first representations of the feed storage places, it is possible to overlay the image acquired by the camera onto these representations.

Advantageously the control system is programmed to regularly refresh the image acquired by the camera. By regularly refreshing the image the actual situation of the feed kitchen can be presented to the user. For example when a feed block has fallen over, the user will see this and can take action. Thus the user may be informed directly about the operational status of the feed system, which results in a better and more efficient feed kitchen management.

In embodiments the representations comprise graphical icons, text, color or hatching lines.

When using graphical icons, text, color or hatching lines, representations may be formed which will instantly convey the situation to the user. For example a particular feed type, such as maize, may always be represented by a fill color yellow in the feed place optionally accompanied by a maize icon or the word "maize'. Other colors or other icons may be assigned to other feed types. The system may provide a set-up screen where the user may choose colors, text, icons, hatchings to his own preferences and assign them to the feed types he uses.

Embodiments will now be described, by way of example only, with reference to the accompanying drawings, and in which.

Figure 1:
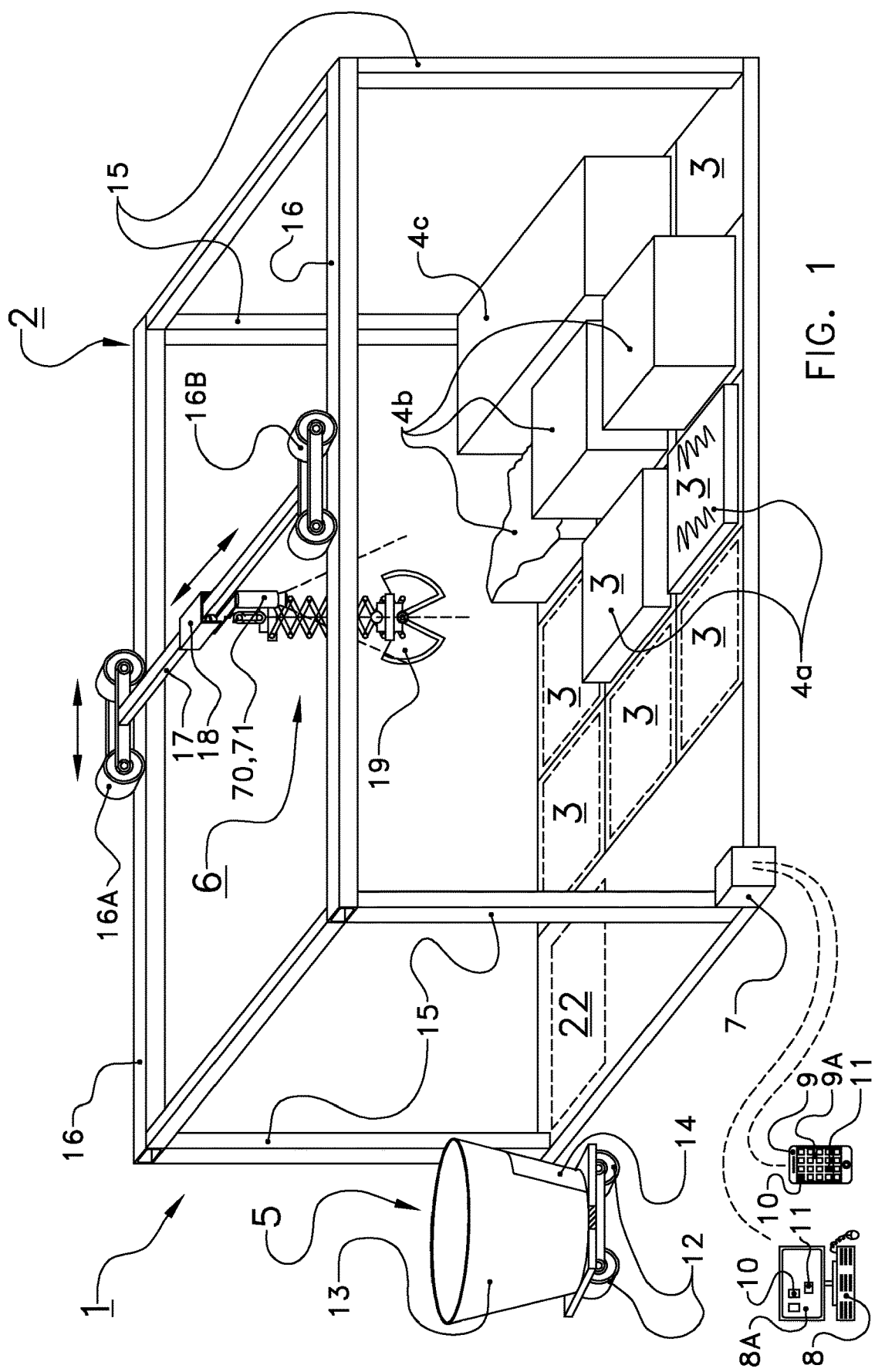
FIG. 1 is a schematic view of a feeding system according to an embodiment of the invention.

In FIG. 1 the automatic feeding system is denoted in its entirety by 1. The feed system 1 comprises a feed kitchen 2 having a ground surface. In the feed kitchen 2 multiple feed storage places 3 are present for feed types 4. In FIG. 1 some feed storage places 3 are empty and others places 3 are provided with feed of feed types 4a, 4b and 4c. A feed distributing device 5 for receiving feed from the feed kitchen is depicted, as well as a feed loading device 6 for loading feed from the feed storage places 3 into the feed distributing device 5. A control system 7 is schematically represented near the feed kitchen, but could also be placed at another location. The control system 7 can communicate with the feed distributing device and the feed loading device, by wire or wirelessly by for example via Bluetooth or Wi-Fi. Communication by wire is possible through a communication dock where the feed distributing device may be docked e.g. when it is being loaded.

The control system is provided with a memory in which data are stored. The data include a feed type library and a ration library. The ration library comprising recipes for making rations, each recipe prescribing which and how much of at the different feed types is to be loaded into a mixing and feeding device, such as e.g. the distributing device 5. The control system is programmed to control the loading device to load the distributing device according to a ration, i.e. with the predetermined feed types and quantities thereof.

The control system 7 also comprises a graphical user interface or GUI 8,9 with a screen 8A, 9A. In FIG. 1 the screen 8A,9A of the GUI 8,9 is shown to be part of a computer 8 or a smartphone 9 respectively. Of course other interfaces with screens may also be used, such as e.g. a tablet.

The GUI in FIG. 1 is depicted schematically with representations of the feed storage places (10) in a floor plan, as well as representations of the feed types (11). The GUI is further explained in relation to FIGS. 2A-2C.

The feed distributing device 5 of the depicted embodiment is a self-propelled feed wagon which can drive with wheels 12 over the ground. The feed wagon comprises a holder 13 for the reception of feed, a mixing device (not shown) for mixing the feed loaded into the holder and a feed dispensing device 14. The feed wagon drives by means of a drive and control system for driving and controlling the feed wagon (not shown) and its wheels. Typically the feed wagon will receive the data it needs from the control system. In FIG. 1, the feed distributing device is shown positioned in the feed kitchen 2 at feed loading point 22 where it is stationed in order to be loaded with feed by the feed loading device.

The feed loading device 6 of the depicted embodiment is a bridge crane with a traveling crane bucket. The bridge crane 6 including a frame with vertical supports 15, with runway beams 16 and a movable bridge 17 which can drive back and forth along the runway beams 16 with wheel sets 16A, 16B on the ends of bridge 17. A trolley 18 is mounted on and movable along the bridge 17, from the trolley hangs crane bucket 19. The crane bucket 19 can be opened and closed, and lifted and lowered in order to pick up feed from a feed storage place. The movements of the trolley together with the bridge are used to transport the feed in the bucket to the feed wagon, where it can be loaded into the container of the feed wagon. Such bridge cranes are known in the art thus are not further explained. The bridge crane will receive the data it needs to load the feed wagon from the control system either directly or via the feed wagon. Of course other types of loading devices are also possible, such as other types of cranes when a crane bucket is used, such as e.g. a gantry crane.

The feeding system may include one or more stationary devices integral with feed storage places, such as e.g. feed storage containers with integral transporting means with which feed in the stored container is transported to a dispensing point. The dispensing point may be located at the feed loading point 22 where the feed distributing device (like a feed wagon) will stationed when this feed is to be loaded. Some feeding systems have only stationary feed storage containers and the feed distributing device will navigate to several of storage places, i.e. their dispensing points when the ration is formed in order to have the feed types loaded.

Alternatively the system may include a self loading feed wagon in which the feed distributing device and the feed loading device are integrated.

In order for the bridge crane to pick up feed from a particular feed storage place, or for a feed distributing device to navigate to a storage place, it will need to know the location of that storage place. The location data of all feed storage places are stored in the memory of the control system.

Figure 2A:
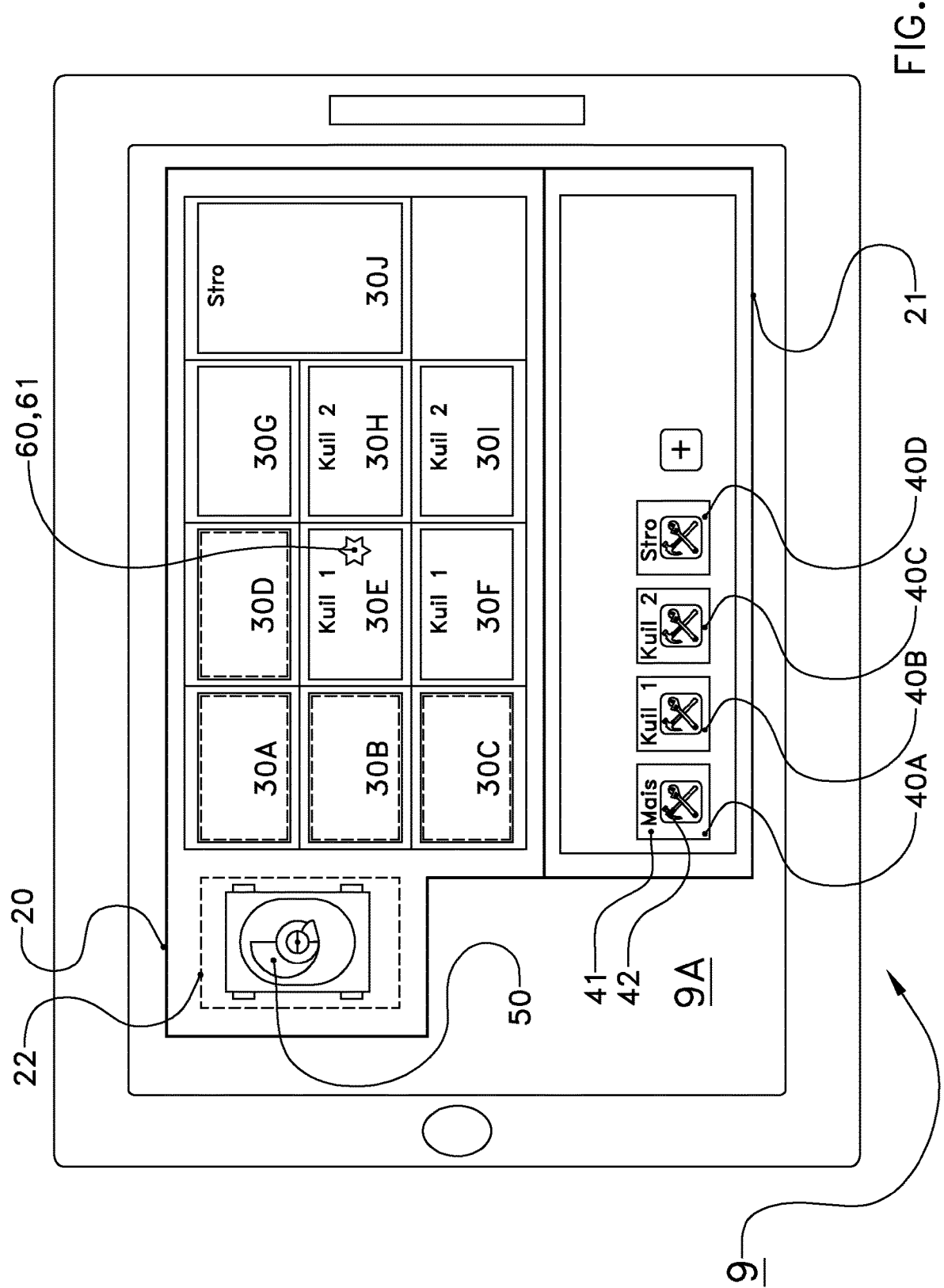
FIGS. 2A, 2B and 2C is a GUI on the screen with manipulable representations according to an embodiment of the invention, schematically illustrating a situation before, during and after a drag and drop action.

As shown in FIG. 2A, the GUI of the control system in use on tablet 9 (or smartphone) and displayed on touch screen 9A. The GUI shows a representation of the floor plan 20 of the feed kitchen 2 as well as of the feed type library 21 of the control system. The floor plan 20 of the feed kitchen depicts feed storage places 3 as first representations 30A-30J in the form of rectangles with dotted demarcation lines (30A-30-D), or with closed demarcation lines (30E-30J). The rectangles with the dotted demarcation lines are first representations of the storage places which are not yet linked to a feed type and the ones with the closed demarcation lines are first representations of the storage places to which a feed type is linked. In the control system of each of the storage places the location data are known.

Figure 2B:
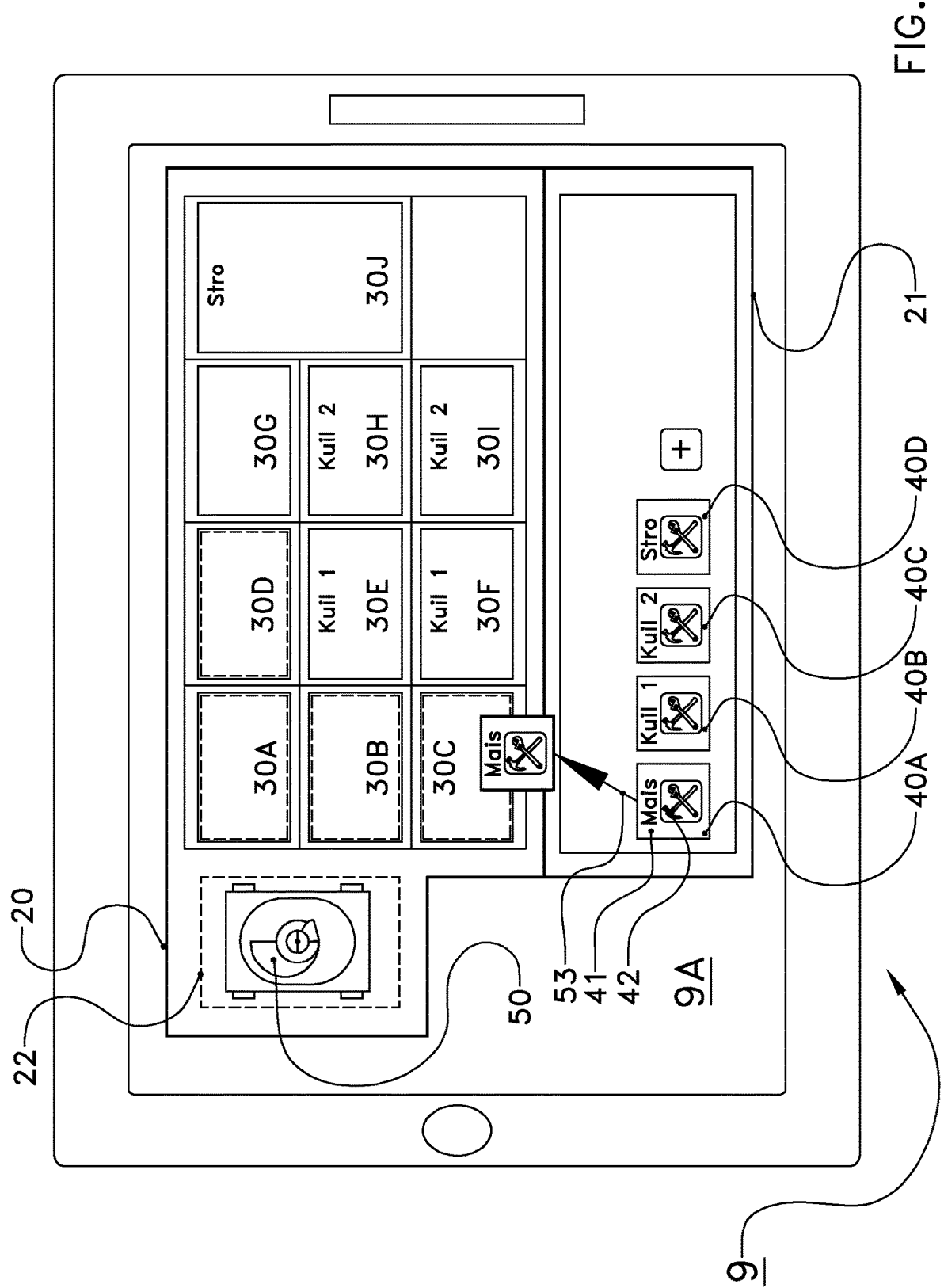
Figure 2C:
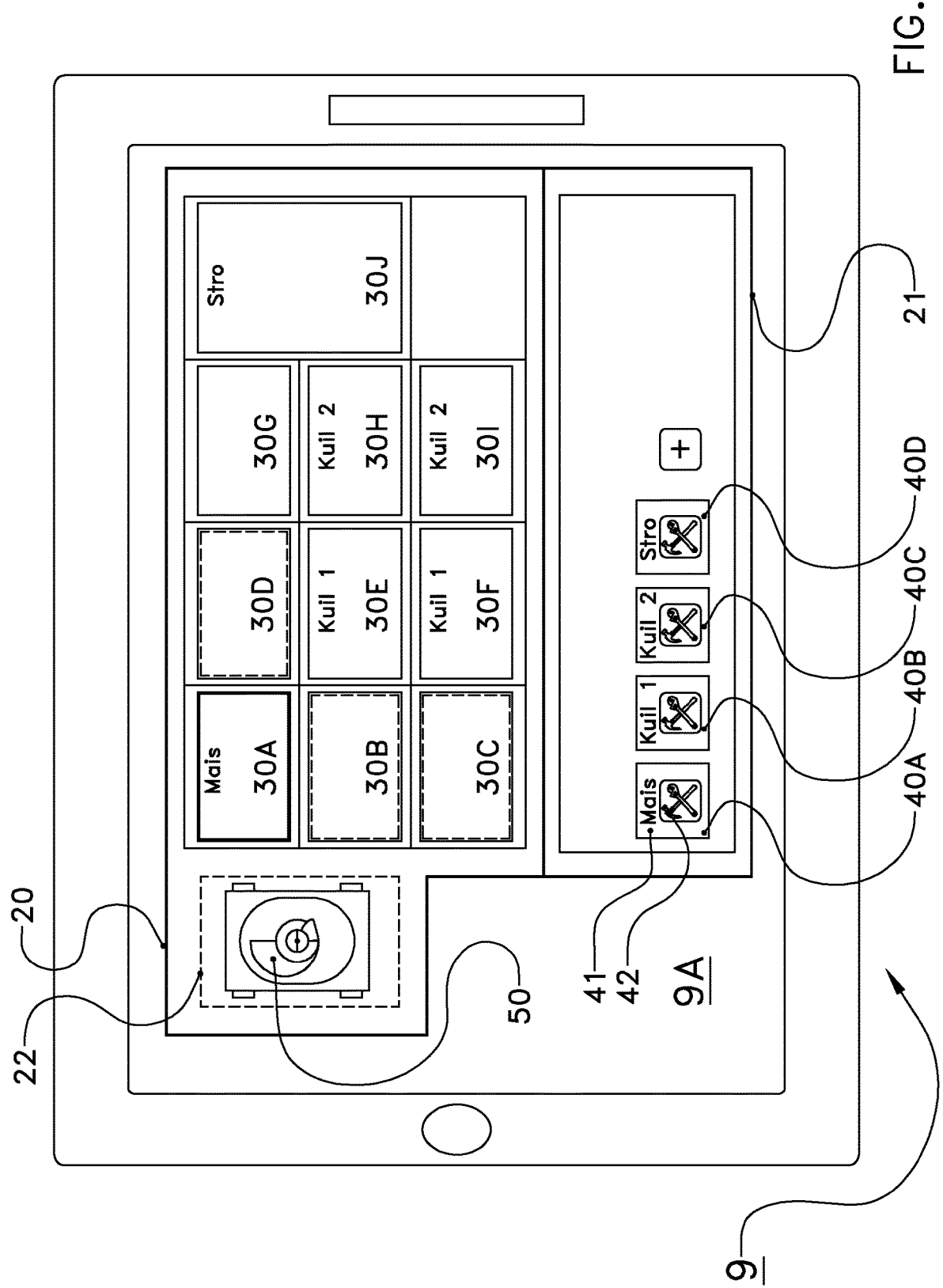

In the GUI the feed type library 21 depicts the feed types 4 by second representations 40A-40D in the form of squares (40A-40D), including a text label 41 with the name of the food type and an icon 42 inside the square indicating that the square is a setting changing representation. The text labels 41 in the FIGS. 2A-2C represent feed types maize, silage1, silage2 and straw by the names "mais", "kuil1", "kuil2" and "stro" respectively. As many text labels as feed types may be used. The feed type setting icons 42 include a representation a hammer and wrench crossing in the shape of the letter X. Other types of setting icons can be used, typically setting icons include a representation of one or more tools tool such as hammer and/or wrench, a gear wheel, or a combination of a gear wheel and a wrench or the like.

In this embodiment the feed types are also represented by a color, yellow is used to indicate feed type maize, orange for silage1, green for silage2 and light yellow for straw (not visible in the drawing figures). In this manner the user will not need to read the text label, but from the color will know what type of feed is present. A feed storage place to which no feed type is linked may be white or a color not yet used to for a feed type.

In the floor plan 20 of the feed kitchen the feed loading place 22 is depicted by a rectangle 22 with dotted demarcation lines. In the feed loading place the feed distributing device 5 is depicted by schematic feed wagon 50.

FIG. 2B shows the GUI of FIG. 2A in which second representation 40A, which represents feed type maize is in the process of being dragged to first representation 30A of a feed storage place. The arrow 53 indicates a the trajectory along which the representation had been moved by the user on touch screen 9A. This arrow is not part of the GUI. However in case a computer screen is used, and a mouse is used to drag and drop arrow 53 could represent the mouse pointer and remain visible during the drag and drop action in the GUI. While being dragged the representation remains visible for the user. Also the representation 40A is still available in the feed type library. The representation that is being dragged is programmed to be a copy of the representation in the feed library this precludes that by dragging the feed type representation out of the feed type library to another place, no feed type representation remains when in the feed type library. Other types of programming which ensure that there is always a feed type representation in the feed library after a dragging and dropping action, may also be used.

FIG. 2C shows the GUI of FIG. 2A, in which the maize food type representation 40A, has been dropped in the feed storage place representation 30A. The result is that feed storage place 30A now is rectangle with closed borders and the text label 'mais' and as such depicts that feed type 'mais' is linked in the control system to feed storage place 30A.

The effect of the manipulation by the user on the screen of dragging the second representation 40A and drop it into first representation 30A is that the control system links the feed type maize to storage place 30A provided that the respective first and second representation fulfill a link criterion after the drag and drop action.

In this case the link criterion is fulfilled only when the second representation is dropped within the lines delimiting a first representation. This is to ensure that there is no ambiguity of the users intentions which feed type he wants to link to which feed storage place. Such ambiguity could be present when the second representation is dropped while overlapping the borders of e.g. adjacent rectangles 30A and 30B.

An alternative link criterion with which the control system may be programmed is that the link criterion is fulfilled when the second representation at least partially overlaps the first representation. In a feed kitchen with a lot of room between the feed storage places such a partial overlap may be enough. In such instances the feed type representation may even be depicted as a text label icon or text adjacent the feed storage place. Alternatively the link criterion may be the amount of overlap of the second representation with a first.

Note that the link criterion is being assessed based on the relative locations of the first and second representations on the screen when the users drops the second representation. Location of the representations on the screen can be determined based on pixel coordinates by suitable image recognition programming.

FIG. 2A also shows the GUI of a feed kitchen including a third representation 60 depicted as a star 61 in feed storage place 30E. The star 61 is a priority indication added by the user indicating that the feed present in feed storage place 30E is to be fed first, i.e. before the same feed type present at feed storage places 30D or 30F. In this example the feed type silage, depicted by text label "Kuil1" and color orange, is present at feed storage places 30D-30F, but only the storage place 30E has the star 61. Thus the control system now received the status data about the priority and is now programmed to instruct the feed loading device to take the feed from the storage place 30E, when preparing a ration for which this feed type is required. Priority starts when the user drags the star to a feed storage place and drops it, which sends the status data to the control system. This is similar to the drag and drop action to link a feed type to a storage place. Analogously the priority status ends when the storage place is empty or when the user removes the priority indication, e.g. by dragging the star representation to an icon of a recycle bin (not shown). Alternatively this third representation 60, e.g. the priority star 61 may already be present and depicted in each representation of the feed storage places and can be activated or inactivated by the user selecting, e.g. it by touching it with his finger (or mouse pointer when the screen is not a touch screen).

The user prioritizes a feed place e.g. because he adheres to a 'first in/first out" storage management and wants to feed the older feeds first. By using the priority indication there is no need to physically move the older feeds around when re-stocking the feed kitchen.

Or the user prioritizes a feed storage place because he has noticed that e.g. the feed block at that location as fallen over or its quality has deteriorated.

The system may include other third representations based on other status data acquired by the control system, such as the quantity of feed at a feed place, the temperature of the feed at a feed place, the results of measurements of feed components of feed at a feed place, the feed place from which feed currently being loaded into the feed distributing device, or of the actual location of the feed distributing device, or the like.

In a system equipped with sensors, these sensors may gather status data and the control system can be programmed to automatically display a relevant third representation when the status data fulfills a predefined criterion.

For example the feeding system may include a temperature sensor to sense the temperature of the feed at the various feed storage locations. The control system may be programmed to prioritize a feed at a certain feed storage location based on the measured temperature, e.g. a threshold temperature may be set and when temperature rises above the threshold the feed will be prioritized by the system to be used first. In this case when feed is heating up, e.g. because it lies in the sun and the threshold temperature is exceeded this feed will automatically be prioritized for feeding.

Alternatively the system can be programmed to instead display the temperature of the feed as a third representation.

Alternatively the system can be programmed to only display the temperature when the user requests this.

The quantity of the feed at the feed storage place can be tracked by the feeding system because it knows how much it has taken form the storage place because it prepares the ration by loading a certain amount of feed. The resulting remaining amount of feed at the storage place can then be made into a third representation, such as e.g. color intensity which will decrease as the amount of feed decreases. Or hatchings or using a storage level icon which may suggest a 3D stack that decreases in height when the storage amount decreases.

In FIG. 1 a location data acquisition 70 system is schematically displayed as camera 71 on feed loading device 6. A fixed camera in the ceiling of the feed kitchen could also be used.

The a location data acquisition system which is programmed to acquire the location data of the feed storage places and to store them in the memory of the control system.

The camera 71 comprising an image acquisition device and an image processing device (not shown) and is programmed to acquire and to process an image of the feed kitchen and to determine the location data of the feed storage places and to store the location data in the memory of the control system.

When using a camera in the feed kitchen the system becomes easier to set up, because the feed kitchen image can be processed to recognize the feed places. For example a feed storage bunker can be recognized and its location can be determined by triangulation from a known camera position. Alternatively, the storage places could be marked out on the floor e.g. by painting outlines where the bunkers or blocks of feed should be positioned. These markings will appear in the image and can be identified by the image processing means and its the locations can be determined by triangulation form the camera position. The representations of e.g. the feed storage places can easily be made in accordance to the actual layout of the storage places. For example in FIGS. 2A-2C the feed storage places 30A-30I are shown to be as a three by three layout with feed storage place 30J at the right end and being as big as two of the other feed storage places. However feed kitchens having a different layout, such as two by six also exist. It is then desired to have the representations of the feed storage places to follow the actual layout of the real kitchen, which becomes easier to do when an image of the actual locations is available.

The control system can be programmed to display the feed kitchen image on the screen together with the graphical user interface, that is the feed kitchen GIU can be used as an overlay onto the feed kitchen camera image. This live view of real feed kitchen together with the GUI and its first, and third representations presents an augmented reality to the user who will instantly recognize the situation. It also presents the possibility, when the image is regularly refreshed, to present the actual situation of the feed kitchen to the user. For example when a feed block has fallen over, the user will see this and can take action. Thus the user may be informed directly about the operational status of the feed system, which results in a better and more efficient feed kitchen management.

The invention is not limited to the illustrative embodiment represented in the figures. The person skilled in the art can make various modifications which lie within the scope of the invention. In this respect the manipulable feed type representations 40A-40D, may also be represented by a selectable list of feed types. Also the control system 7 as depicted in FIG. 1, must not be taken as limited to a device mounted to the feed kitchen. The control system of the invention must be interpreted as a broad term to encompass the entire control of the feeding system. As such it includes a central control which sends data to and acquires data from the system and the parts thereof such as the feed distribution device, a management program for managing the whole system using data of e.g. the feed type and feed ration library and from the central control, as well as the local control of e.g. the driving of the machines such as the feed distribution device and the feed loading device. The GUI may then be created on a handheld device such as a smartphone, based on data acquired by the smartphone from the management program which is fed by data from the central control.

The invention claimed is:

1. An automatic feeding system for preparing at least one feed ration from a plurality of feed types for ruminant animals, the system comprising:
   a feed kitchen with multiple feed storage places for storing a plurality of feed types;
   a feed distributing device for receiving feed from the feed kitchen;
   a feed loading device to load feed from the feed storage places into the feed distributing device; and
   a control system to control the automatic feeding system, the control system being programmed to determine per ration which feed types and how much of the feed types are to be loaded into the feed distributing device and to control the loading device and feed distributing device to prepare the ration accordingly,
   wherein the control system comprises:
      a memory with location data of the feed storage places stored in the memory, wherein the control system is programmed to link a feed type to each of the feed storage places represented by the location data; and
      a graphical user interface with a display screen, including a floor plan comprising first representations of each of the feed storage places and second representations of the feed types which first representations are formed based on at least the feed storage location data,
   wherein the control system is programmed to link a feed type to a storage place when a respective first representation and second representation fulfill a link criterion after an action by the user to indicate the feed type in each feed storage place, and
   wherein the link criterion results in a visual association of one of the second representations of the feed types with one of the first representations.

2. The system of claim 1, wherein the action is one of a select action or a drag and drop action.

3. The system of claim 1, wherein the link criterion is fulfilled for a drag and drop action when a predetermined distance between the respective representations remains.

4. The system of claim 1, wherein the link criterion is fulfilled for a drag and drop action when the respective representations at least partially overlap.

5. The system of claim 1, wherein the screen is a touch screen.

6. The system of claim 1, wherein the graphical user interface further comprises third representations based on status data acquired by the control system, the third representations being representations of status data such as the quantity of feed at a feed place, the temperature of the feed at a feed place, the results of measurements of feed components of feed at a feed place, the feed place from which feed currently is to be loaded into the feed distributing device, a priority indication for the system to first load feed from a feed place, or of the actual location of the feed distributing device.

7. The system of claim 6, wherein control system is programmed to display the third representations either when the user requests display or when the status data fulfills a predefined criterion.

8. The system of claim 1, further comprising a location data acquisition system which is programmed to acquire the location data of the feed storage places and to store them in the memory of the control system.

9. The system of claim 8, wherein the location data acquisition system comprises a camera positioned in the feed kitchen and comprising an image acquisition device and an image processing device and being programmed to acquire and to process an image of the feed kitchen and to determine the location data of the feed storage places and to store the location data in the memory of the control system.

10. The system of claim 9, wherein the control system is programmed to display the image of the feed kitchen acquired by the camera on the screen together with the first and second representations of the graphical user interface.

11. The system of claim 9, wherein the control system is programmed to display the image of the feed kitchen acquired by the camera and the first and second representations of the graphical user interface in layers.

12. The system of claim 1, wherein the representations comprise graphical icons, text, color or hatching lines.

13. The system of claim 2, wherein the link criterion is fulfilled for a drag and drop action when a predetermined distance between the respective representations remains.

14. The system of claim 2, wherein the link criterion is fulfilled for a drag and drop action when the respective representations at least partially overlap.

15. The system of claim 2, wherein the screen is a touch screen.

16. The system of claim 3, wherein the screen is a touch screen.

17. The system of claim 4, wherein the screen is a touch screen.

18. The system of claim 2, wherein the graphical user interface further comprises third representations based on status data acquired by the control system, the third representations being representations of status data such as the quantity of feed at a feed place, the temperature of the feed at a feed place, the results of measurements of feed components of feed at a feed place, the feed place from which feed currently is to be loaded into the feed distributing device, a priority indication for the system to first load feed from a feed place, or of the actual location of the feed distributing device.

19. The system of claim 3, wherein the graphical user interface further comprises third representations based on status data acquired by the control system, the third representations being representations of status data such as the quantity of feed at a feed place, the temperature of the feed at a feed place, the results of measurements of feed components of feed at a feed place, the feed place from which feed currently is to be loaded into the feed distributing device, a priority indication for the system to first load feed from a feed place, or of the actual location of the feed distributing device.

20. The system of claim 4, wherein the graphical user interface further comprises third representations based on status data acquired by the control system, the third representations being representations of status data such as the quantity of feed at a feed place, the temperature of the feed at a feed place, the results of measurements of feed components of feed at a feed place, the feed place from which feed currently is to be loaded into the feed distributing device, a priority indication for the system to first load feed from a feed place, or of the actual location of the feed distributing device.

* * * * *